(12) United States Patent
Giliberto

(10) Patent No.: US 10,657,699 B1
(45) Date of Patent: May 19, 2020

(54) PERFORMING TEXTURING OPERATIONS FOR SETS OF PLURAL EXECUTION THREADS IN GRAPHICS PROCESSING SYSTEMS

(71) Applicant: Arm Limited, Cambridge (GB)

(72) Inventor: Carmelo Giliberto, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/214,060

(22) Filed: Dec. 8, 2018

(51) Int. Cl.
| | |
|---|---|
| *G06T 15/00* | (2011.01) |
| *G06T 15/04* | (2011.01) |
| *G06T 1/20* | (2006.01) |
| *G06F 9/38* | (2018.01) |
| *G06F 9/48* | (2006.01) |

(52) U.S. Cl.
CPC ............ *G06T 15/04* (2013.01); *G06F 9/3877* (2013.01); *G06F 9/48* (2013.01); *G06T 1/20* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 5,945,997 A | * | 8/1999 | Zhao ........................ | G06T 11/40 345/581 |
| 6,181,347 B1 | * | 1/2001 | Devic ....................... | G06T 15/04 345/586 |
| 7,593,018 B1 | * | 9/2009 | Toksvig ................. | G06T 3/4007 345/582 |
| 7,663,621 B1 | * | 2/2010 | Allen ....................... | G06T 15/04 345/419 |
| 9,613,389 B2 | * | 4/2017 | Moy .......................... | G06T 1/20 |
| 9,811,875 B2 | * | 11/2017 | Goodman ................. | G06T 1/60 |
| 9,898,838 B2 | * | 2/2018 | Shim ......................... | G06T 1/20 |
| 9,947,071 B2 | * | 4/2018 | Ramani ..................... | G06T 1/60 |
| 10,074,210 B1 | * | 9/2018 | Spencer ............... | G06T 15/005 |
| 10,089,709 B2 | * | 10/2018 | Engh-Halstvedt ........ | G06T 1/20 |
| 10,127,626 B1 | * | 11/2018 | Ostby ....................... | G06T 1/20 |
| 10,235,799 B2 | * | 3/2019 | Nevraev .................. | G06T 15/80 |
| 10,510,185 B2 | * | 12/2019 | Saleh .................... | G06T 15/005 |
| 2005/0007380 A1 | * | 1/2005 | Haaker ................... | G06T 15/04 345/582 |
| 2008/0016319 A1 | * | 1/2008 | Pappalardo ......... | G06F 9/30036 712/22 |

(Continued)

*Primary Examiner* — Martin Mushambo
(74) *Attorney, Agent, or Firm* — Vierra Magen Marcus LLP

(57) ABSTRACT

When a texture mapper in a graphics processor is to perform a texturing operation for a set of plural execution threads together, the texture mapper determines whether the texturing operation for the set of plural threads can be performed together with the texturing operation for another set of plural execution threads for which a texturing operation is required. When the texture mapper determines that the texturing operations for the sets of plural execution threads can be performed together, it performs the texturing operations for the sets of plural threads together, but when it determines that the texturing operation for the set of plural threads cannot be performed together with the texturing operation for another set of plural execution threads, it performs the texturing operation for the set of plural execution threads alone.

24 Claims, 7 Drawing Sheets

(56) References Cited

U.S. PATENT DOCUMENTS

| | | | | |
|---|---|---|---|---|
| 2008/0055335 A1* | 3/2008 | Jung | ................. | G06T 15/04 |
| | | | | 345/609 |
| 2010/0259536 A1* | 10/2010 | Toksvig | ................. | G06F 9/524 |
| | | | | 345/418 |
| 2011/0069076 A1* | 3/2011 | Lindholm | ............. | G06T 11/001 |
| | | | | 345/552 |
| 2012/0079503 A1* | 3/2012 | Dally | ................. | G06F 9/3851 |
| | | | | 718/108 |
| 2013/0044108 A1* | 2/2013 | Tanaka | ................. | G06T 15/04 |
| | | | | 345/419 |
| 2014/0240329 A1* | 8/2014 | Tarjan | ................. | G06T 15/04 |
| | | | | 345/520 |
| 2014/0240337 A1* | 8/2014 | Lindholm | ............... | G09G 5/06 |
| | | | | 345/582 |
| 2015/0143061 A1* | 5/2015 | Khailany | ................. | G06F 9/38 |
| | | | | 711/154 |
| 2015/0379764 A1* | 12/2015 | Lentz | ................. | G06F 9/44 |
| | | | | 345/422 |
| 2016/0140737 A1* | 5/2016 | Hui | ................. | G06T 15/04 |
| | | | | 345/583 |
| 2016/0292907 A1* | 10/2016 | Burns | ................. | G06T 15/04 |
| 2017/0161940 A1* | 6/2017 | Liktor | ................. | G06T 15/005 |
| 2018/0322078 A1* | 11/2018 | Qiu | ................. | G06F 12/0811 |
| 2019/0294439 A1* | 9/2019 | Ostby | ................. | G06T 1/20 |

* cited by examiner

PERFORMING TEXTURING OPERATIONS FOR SETS OF PLURAL EXECUTION THREADS IN GRAPHICS PROCESSING SYSTEMS

BACKGROUND

The technology described herein relates to a method of and an apparatus for performing texture mapping in graphics processing systems.

It is common in graphics processing systems to generate colours for sampling positions in a render output (e.g. image to be displayed) by applying so-called textures or texture data to the surfaces to be drawn. Such textures are typically applied by storing an array of texture elements or "texels", each representing given texture data (such as colour, luminance and/or light/shadow, etc. values), and then mapping the texels onto the corresponding elements, such as (and, indeed, typically) a set of sampling positions, for the render output in question (e.g. image to be displayed).

Thus a graphics texture will typically be configured as an array of data elements (texture elements (texels)), each having a corresponding set of texture data stored for it. The texture data for a given position within the texture is then determined by sampling the texture at that position (e.g. using a bilinear interpolation process).

FIG. 1 shows an exemplary graphics processor (graphics processing unit (GPU)) 100 that can perform texture mapping.

As shown in FIG. 1, the GPU 100 comprises data processing circuitry that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When instructed by the fragment shader 104 to perform a texture mapping operation, the texture mapper 110 reads textures from the memory 108 (as required), performs the texture mapping operation, and returns a (e.g. RGB) colour sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

The Applicants believe that there is scope for improvements to the performance of texture mapping in graphics processing systems.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
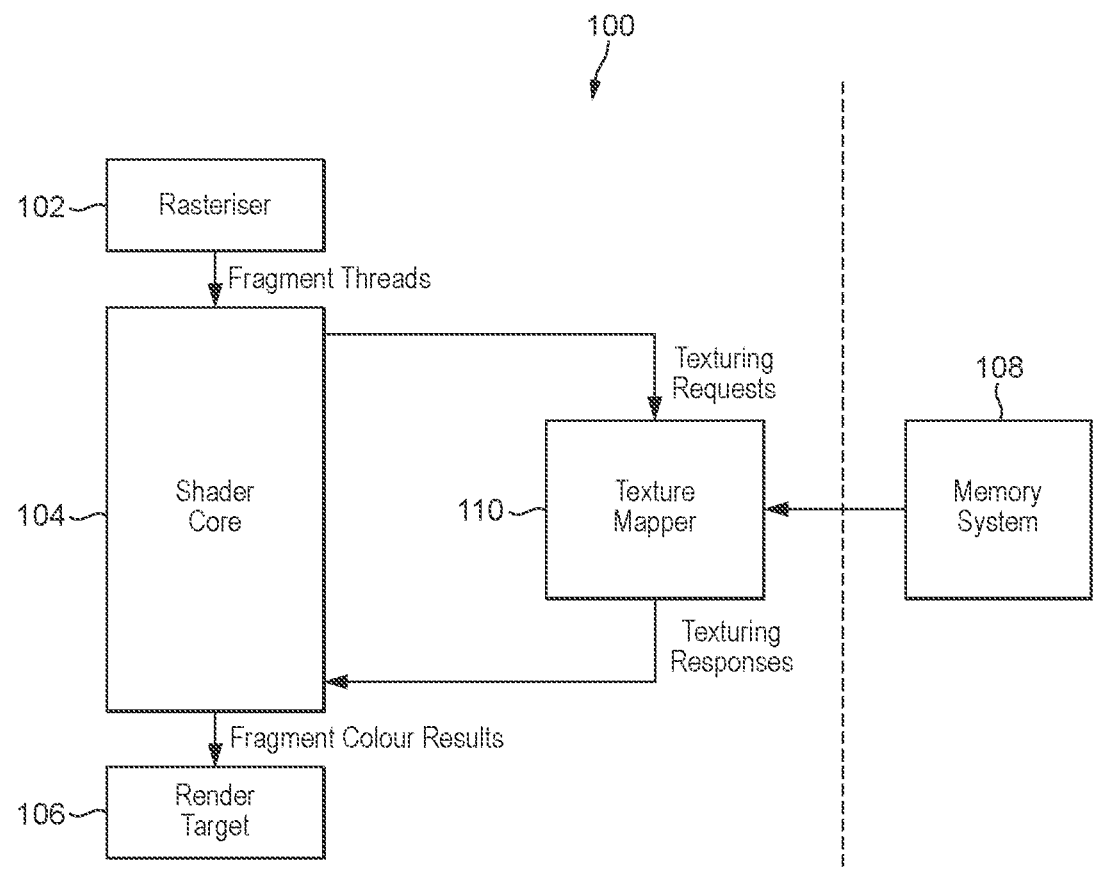
FIG. 1 shows schematically a graphics processor that includes a texture mapper.

A first embodiment of the technology described herein comprises a method of operating a graphics processor, the graphics processor comprising:

a programmable fragment shader operable to execute graphics fragment shading programs to perform fragment shading operations; and a texture mapper operable to perform graphics texturing operations in response to requests for graphics texturing operations from the fragment shader;

wherein:

the fragment shader processes graphics fragments by executing fragment shader programs using respective execution threads for sampling positions of a render output being generated by the graphics processor; and the fragment shader is operable to, when it encounters a graphics texturing instruction in a fragment shader program that it is executing for a thread:

request the texture mapper to perform a graphics texturing operation for a set of plural threads that are executing the graphics texturing instruction in the fragment shader program; and the texture mapper is operable to, in response to a request from the fragment shader to perform a texturing operation for a set of plural execution threads that are executing a graphics texturing instruction in a shader program:

perform the texturing operation for the set of plural execution threads together;

the method comprising:

when the texture mapper is to perform a texturing operation for a set of plural execution threads together, the texture mapper:

determining whether the texturing operation for the set of plural threads can be performed together with the texturing operation for another set of plural execution threads for which a texturing operation is required; and when it is determined that the texturing operations for the sets of plural execution threads can be performed together, performing the texturing operations for the sets of plural threads together; and when it is determined that the texturing operation for the set of plural threads cannot be performed together with the texturing operation for another set of plural execution threads for which a texturing operation is required, performing the texturing operation for the set of plural execution threads alone.

A second embodiment of the technology described herein comprises a graphics processor, the graphics processor comprising:

a programmable fragment shader operable to execute graphics fragment shading programs to perform fragment shading operations; and a texture mapper operable to perform graphics texturing operations in response to requests for graphics texturing operations from the fragment shader;

wherein:

the fragment shader processes graphics fragments by executing fragment shader programs using respective execution threads for sampling positions of a render output being generated by the graphics processor; and the fragment shader is operable to, when it encounters a graphics texturing instruction in a fragment shader program that it is executing for a thread:

request the texture mapper to perform a graphics texturing operation for a set of plural threads that are executing the graphics texturing instruction in the fragment shader program;

the texture mapper is operable to, in response to a request from the fragment shader to perform a texturing operation for a set of plural execution threads that are executing a graphics texturing instruction in a shader program:

perform the texturing operation for the set of plural execution threads together;

and the texture mapper is further configured to:

when the texture mapper is to perform a texturing operation for a set of plural execution threads together:

determine whether the texturing operation for the set of plural threads can be performed together with the texturing operation for another set of plural execution threads for which a texturing operation is required; and when it is determined that the texturing operations for the sets of plural execution threads can be performed together, perform the texturing operations for the sets of plural threads together; and when it is determined that the texturing operation for the set of plural threads cannot be performed together with the texturing operation for another set of plural execution threads for which a texturing operation is required, perform the texturing operation for the set of plural execution threads alone.

The technology described herein relates to texture mapping in graphics processing. In the technology described herein, when a fragment shader of a graphics processor encounters texturing instructions to be processed, it requests the appropriate texture mapping operations from an associated texture mapper of the graphics processor. Furthermore, the texture mapping operations are configured such that they are performed for a set of plural execution threads (and thus sampling positions) (and as will be discussed further below, in an embodiment for a "quad" of four sampling positions) at the same time.

The Applicants have recognised in this regard that in many graphics processing systems and standards, texturing operations may frequently consider plural, and in particular 2×2 "quads" of, sampling positions together, for example for the purposes of calculating derivatives (e.g. along the x and y axis). The texture mapping operation of the technology described herein is therefore configured to process texture mapping operations for sets of plural sampling positions (and thus execution threads) together.

Moreover, in the technology described herein, the texture mapper is operable to determine whether respective separate sets of plural execution threads (e.g. "quads") for which it is performing texturing operations can in fact be processed together (be "merged") into a single texturing operation sequence that performs the texturing operation for the plural sets of plural threads together. As will be discussed further below, this can then increase the efficiency and throughput of the texture mapping process, as rather than the texture mapping operations for each of the separate sets of plural threads (e.g. quads) having to be performed as their own respective sequence of processing operations, the texture mapping operations for the plural sets of plural execution threads (e.g. quads) can be performed using the same, single sequence of processing in the texture mapper.

The graphics processor of the technology described herein includes a programmable fragment shader that executes graphics fragment shading programs to perform fragment shading operations. The fragment shader is a programmable processing stage that executes shader programs on input data values to generate a desired set of output data (in this case shaded and rendered fragment data) for processing by the rest of the graphics processor and/or for output. The fragment shader will perform fragment shading processing by executing a program or programs for each sampling position in a graphics (render) output being generated. Each sampling position will be processed by means of an execution thread that will execute the fragment shader program in question for the sampling position in question.

The fragment shader will be implemented as an appropriate programmable processing circuit (circuitry) (as a "shader core"). There may be a separate programmable processing circuit provided for the fragment shader, or the fragment shader may be executed on the same programmable processing circuit as other shaders of the graphics processor.

In an embodiment, the fragment shader is configured such that (and operates such that) execution threads may be grouped together into thread groups, in which the threads of the group are executed in lockstep, one instruction at a time. In this way, it is possible to share instruction fetch and scheduling resources be all the threads in the group. (Other terms used for such thread groups include "warps" and "wave fronts". For convenience, the term "thread group" will be used herein, but this is intended to encompass all equivalent terms and arrangements, unless otherwise indicated.)

The technology described herein relates to the situation where a fragment shader program being executed by the fragment shader includes instructions to perform graphics texturing operations. When the fragment shader encounters such an instruction in a shader program that it is executing for a thread, the fragment shader sends an appropriate request to the texture mapper to perform the required graphics texturing operation.

The texturing operation instruction may, for example, be included in the fragment shader program by the application programmer (to thereby allow an application programmer to explicitly specify that a texturing operation is to be performed), and/or the, e.g. compiler, for the fragment shader could also or instead be operable to include appropriate texturing operation instructions in a fragment shader program, e.g. in response to identifying program expressions that relate to and/or that require texturing operations.

Other arrangements would, of course, be possible.

When the fragment shader recognises a texturing operation instruction in a fragment shader program that is executing, it sends an appropriate request for the texture mapping operation to the texture mapper. In an embodiment, an appropriate texturing operation instruction is provided to the texture mapper, in response to which the texture mapper will perform the texturing operation.

Thus, in an embodiment, an appropriate texturing operation instruction will be included in a shader program to be executed by the fragment shader, and be recognised by the fragment shader as a texturing operation instruction, with the fragment shader then operating to send appropriate instructions to the texture mapper to perform the texturing operation (and return the result of the texturing operation to the fragment shader core for further processing and/or other use).

The texturing operation request, e.g. texturing operation instruction, in an embodiment indicates that a texturing operation is to be performed, and the texture(s) (the set of texture data values) to be used for the texturing operation. In an embodiment, the texturing operation request (e.g. instruction) indicates where the texture data for the texturing operation is stored, with the texture mapper then fetching the texture data from where it is stored in response to the instruction. The texture mapper in an embodiment then performs the indicated texturing operation on the indicated texture data values.

Thus, in an embodiment, the texture mapper includes data processing circuitry operable to receive a texturing operation instruction, and to, in response to receiving the texturing operation instruction, control the texture mapper to fetch texture data values on which the texturing operation is to be performed, and to cause the texture mapper to perform the texturing operation on the fetched set of texture data values.

The request, e.g. instruction, to the texture mapper for the texture mapping operation can take any desired and suitable form. For example, the request may indicate one or more arrays of texture data values or "surfaces" (e.g. textures or "mipmaps") with which the texture mapping operation should be performed. The instructions for the texture mapping operation may, for example, indicate (e.g. using a set of coordinates) a sampling position or positions in respect of which the texture mapping operation should be performed.

Thus, in embodiments, a request (instruction) to perform a texture mapping operation may indicate one or more input parameters (texturing operation settings (control data)), that define (aspects of) the texturing operation to be performed. The input parameters may be indicated using one or more descriptors. The one or more descriptors may be contained in the instruction and/or may be stored (e.g. in memory). The storage (e.g. memory) used to store the one or more descriptors may be the same memory or may be a different memory to that which stores the texture data values. The texture mapper may be operable to fetch, and may fetch, the descriptors and/or input parameters required to perform a texture mapping operation, e.g. from memory, in response to a request to perform a texture mapping operation.

The descriptors may take any desired and suitable form. For example, a descriptor may comprise a "texture descriptor", that may indicate one or more "surface descriptors" for the texture mapping operation. A surface descriptor may indicate and/or describe an array of texture data values or surface (a texture(s)) with which the texture mapping operation should be performed.

The descriptors may further comprise a sampler descriptor. The sampler descriptor may indicate a filtering method (e.g. bilinear, trilinear, etc.) and/or other parameters (settings) to be used for the texture mapping operation.

The texture mapping operation that is being performed can be any desired and suitable form of texture mapping operation. For example, a texture mapping operation may comprise bilinear interpolation, trilinear interpolation, or higher order ("N"-linear) interpolation or anisotropic filtering, etc.

The texture mapping operation can be performed in any desired and suitable way, for example, and in an embodiment, as one or more texture processing passes (e.g. bilinear filtering passes). For example, a texture mapping operation that comprises bilinear interpolation may be performed as a single bilinear filtering pass, a texture mapping operation that comprises trilinear interpolation may be performed as two bilinear filtering passes, a texture mapping operation that comprises higher order ("N"-linear) interpolation or anisotropic filtering may be performed as $2^{(N-2)}$ bilinear filtering passes, etc.

Each texture processing pass may comprise application (multiplication) of a particular number (e.g. 2×2) of calculated interpolation weight values and the particular number (e.g. 2×2) of corresponding texture data values and then accumulation (summation) of the interpolated results. If the texture mapping operation comprises trilinear or higher order texture mapping operation, the summed interpolated results for plural texture processing passes can be suitably combined (e.g. interpolated) to give an output result for the overall trilinear or higher order texture mapping operation in question.

Other arrangements, would, of course, be possible.

In the technology described herein, the texture mapper operates to perform a graphics texturing operation for a set of plural threads that are executing a (the same) graphics texturing instruction in a fragment shader program together (in parallel). In other words, the texturing operation is performed in parallel for a set of plural threads that are executing the same texturing instruction (but that will each be sampling the texture on their own respective set of (texture) coordinates (which may be different to or the same as the coordinates for one or more of the other threads in the set).

The number of threads in the set of plural threads for which the texturing operation is performed together can be any suitable and desired number of threads. The threads in the set of plural threads are in an embodiment "adjacent" (relate to adjacent sampling positions in the render output that is being generated), and in an embodiment correspond to a contiguous rectangular, and in an embodiment square, block of sampling positions.

In an embodiment, the texturing operations are performed for sets of four threads and in an embodiment for four threads that correspond to sampling positions in a 2×2 pattern (thus for a "quad" of sampling positions).

As discussed above, in an embodiment, the fragment shader is operable to process threads as respective groups of threads in lockstep. In that case, the set of plural threads for which a graphics texturing operation is performed together in an embodiment comprises a set of plural threads (and in an embodiment a "quad" of threads), from the same thread group (warp).

In this case, the thread groups (warps) could correspond exactly to the sets of plural threads (e.g. quads) for which the texturing operations are performed together (i.e. such that each set of plural threads for which a graphics texturing operation is performed together comprises a respective, separate, thread group (warp)).

Alternatively, where the thread groups (warps) contain more threads than would be in a set of plural threads (the thread group (warp) width) is greater than a respective set of plural threads (e.g. quad) for which a texturing operation will be performed together), then the set of plural threads (e.g. quad) for which a texturing operation is performed together will be a respective set of plural threads (e.g. quad) from a given thread group (warp).

In an embodiment, each thread group (warp) contains a plurality of sets of plural threads (e.g. quads). In an embodiment each thread group (warp) contains sixteen threads, comprising four sets (quads) of four threads each.

In the technology described herein, when the texture mapper is to perform a texturing operation for a set (e.g. quad) of execution threads together, the texture mapper is able to, and operates to, determine whether the texturing operation for that set of plural threads can be performed together with the texturing operation for another set of plural execution threads for which a texturing operation is required.

The Applicants have recognised here that in the case where plural sets of plural execution threads (e.g. quads) are, for example, all executing the same texturing instruction, then the texture mapper will be performing the same overall texturing operation for each such set of plural threads (e.g. quad), just using different input data values for the respective threads (sampling positions). As such the "control" data for the texturing operations for the different sets of plural execution threads (quads) will be the same, such that a single set of that control data can be used in common for the two or more sets of plural execution threads, and the texturing operation can be performed for the two or more sets of execution threads together, using that control data in common. In this way, the texture mapper can accept and perform a texturing operation for plural sets of plural execution threads (e.g. quads) together.

Thus the texture mapper of the technology described herein is configured to operate such that, and operable such that, plural sets of plural execution threads can share control data (such as, and in an embodiment, the texture descriptors, as discussed above), using a single control data path, when performing texturing operations, such that, where it is appropriate to do so, a texturing operation can be performed for plural sets of plural threads (plural quads) together (in parallel) by the texture mapper.

The number of sets of plural threads (e.g. quads) for which the texturing operation is performed together can be selected as desired. In an embodiment a texturing operation can be (and is) performed for two (and at most two) sets of plural threads (e.g. for two quads) together. Thus, the texturing operation can in an embodiment be, and is in an embodiment, performed for pairs of (for two) sets of plural threads (for pairs of quads), where it is appropriate to do that.

The texture mapper determines whether the texturing operation for a set of plural threads can be performed together with the texturing operation for another set of plural threads (and then either performs the texturing operation for the sets of plural threads together or separately). This determination can be performed as desired, and based on any suitable and desired criteria.

In an embodiment, the texture mapper is operable to merge the texturing operations for two (or more) sets of plural threads when the texturing operations and/or (and in an embodiment and) the parameters (settings) for the texturing operations are sufficiently similar. In an embodiment this is done when the, e.g. two, sets of plural threads (e.g. quads) are performing the same texturing operation, reading the same texture(s), and using the same input (control) parameters (settings) for the texturing operation. In an embodiment the texturing operations for the sets of plural threads are combined where the texturing operations for the sets of plural threads differ only in terms of the texture coordinates that are being sampled by the sets of plural threads (by the individual threads within the sets of plural threads).

In an embodiment the texture mapper can (and does) merge the texturing operations for two (or more) sets of plural threads, when the texturing operations are a particular, in an embodiment selected, in an embodiment predefined, type or types of texturing operation (only). For example, and in an embodiment, bilinear texturing operations can be merged, but trilinear texturing operations will not be merged.

The texture mapper can perform the necessary determination as required (and in an embodiment includes appropriate determination circuitry (a determination circuit) for this purpose), and in any suitable and desired manner.

For example, the texture mapper could be operable to compare the input parameters (control data), e.g. and in an embodiment, the "descriptors", for the texturing operations for the sets of plural execution threads being considered, to see if they are sufficiently similar (and in an embodiment the same), to thereby determine whether the texturing operations for the sets of plural threads can be performed together or not. This check could be done by comparing the content of the, e.g. descriptors, but in an embodiment, is done by comparing respective identifiers, e.g. indices or pointers, that indicate the control data (e.g. descriptors) in question. Thus, if the two sets of plural execution threads being considered have the same descriptor indices/pointers, it will be determined that the texturing operations for the sets of plural execution threads can be combined (but not otherwise).

In an embodiment, the texturing operations for sets of plural execution threads are combined in the manner of the technology described herein where the sets of plural execution threads belong to the same thread group (warp) (as discussed above) (as that should then ensure that the texturing operations share and use the same relevant control data (settings), etc.). Thus, in the case where the fragment shader processes execution threads as respective thread groups (warps) that each (potentially) contain sets of plural execution threads (e.g. plural quads), then the technology described herein will in an embodiment operate to perform the texturing operation for sets of plural threads (e.g. quads) that belong to the same thread group (warp) together.

In an embodiment, the texturing requests sent to the texture mapper can identify that sets of plural execution threads (e.g. quads) for which a texturing request is sent can (potentially) be combined with another set of plural execution threads when performing the texturing operation. In other words, the texturing requests can identify candidate "mergable" sets of execution threads.

This could be provided, for example, in the form of a flag that indicates to the texture mapper that it should be determined whether the texturing operation for the set of plural execution threads for which the texturing operation request has been sent can be performed together with the texturing operation for another set of plural execution threads. In an embodiment, the texturing requests can (and do) include an indicator, such as a flag, identifying the sets of plural execution threads to which the texturing requests relate that belong to the same thread group (warp) (and so can be combined).

Such indications ("hints") can be provided to the texture mapper as desired. For example, the compiler for the fragment shader program could configure the fragment shader program such that when it is executed by the fragment shader, any texturing requests will include appropriate indicators (hints), where appropriate.

In the case where such indications (hints/flags) are used, the texture may only operate to determine if a set of plural threads can be merged with another set of plural threads when the sets of plural threads have appropriate indicators associated with them (or can operate to determine if a set of plural threads can be merged with another set of plural threads when the sets of plural threads irrespective of whether the sets of plural threads have appropriate indicators associated with them or not).

In the case where such indications are not used, the texture mapper in an embodiment operates in any event to determine whether sets of plural threads (e.g. quads) can be merged or not.

It will be appreciated that when operating in the manner of the technology described herein, the texture mapper will need to have a plurality of sets of plural execution threads ready for their texturing operations to be performed, in order to be able to combine the texturing operations of plural sets of plural execution threads. This can be facilitated in any suitable and desired manner.

For example, the texture mapper could maintain a pool of sets of plural execution threads (e.g. quads) ready (and waiting) for their texturing operations to be performed, and then combine the texturing operations of sets of plural execution threads (as appropriate) from that pool.

In one embodiment, the texture mapper is operable to take as an input plural (e.g., and in an embodiment, two) sets of plural execution threads (quads) in the same cycle (i.e. has an input bus that is able to accept plural sets of plural execution threads in one cycle), with the texture mapper then determining whether those input sets of plural execution threads can be "combined" or not.

In this case, when it is determined that the plural sets of plural execution threads can be combined, then the texturing operations for those sets of plural execution threads will be performed together starting in the next processing cycle, but when it is determined that the texturing operations for the sets of plural execution threads should not be performed together, then the texture mapper is in an embodiment operable to perform the texturing operation for one of the sets of plural execution threads in the next cycle, whilst stalling the other set or sets of plural execution threads for that cycle, and then performing the texturing operation for (one of) the other sets of plural execution threads in the next cycle (and so on, where more than two sets of plural execution threads are received as inputs and tested for potentially combining at the same time).

In another embodiment, the texture mapper receives (as inputs) sets of plural execution threads for which texturing operations are to be performed one after another, in successive cycles, and when it receives a set of plural execution threads for a texturing operation (e.g. that is identified as potentially being able to be combined with another texturing operation), stalls that set of plural execution threads for one cycle to see if its texturing operation can be combined (performed together) with the texturing operation of the next set of execution threads, and then either initiates (performs) both texturing operations together in the next processing cycle, or performs the stalled texturing operation in the next cycle on its own (and so on for the sequence of sets of threads (e.g. quads) for which the texturing operation is to be performed).

(In this case, in the case that the next texturing operation to be performed is not identified as potentially being combinable with another texturing operation, then that texturing operation would simply be sent to the texture pipeline for processing in the cycle in question (without stalling).)

Other arrangements would, of course be possible, and can be used, e.g. in dependence upon how many sets of plural execution threads (e.g. quads) the texture mapper is able to receive as an input in a single cycle, with the processing being appropriately stalled for however many cycles are required to "collect" plural sets of plural execution threads for processing together (where it is appropriate to do that). For example, where it takes two cycles to input a single set of plural execution threads, then the processing of that set of plural execution threads would be stalled for two cycles whilst the next set of plural execution threads is loaded.

The texture mapper (texture mapping apparatus) can perform the required texture mapping operations in any suitable and desired manner, and, correspondingly, can include any suitable and desired circuits, units and stages for performing texture mapping operations.

In an embodiment, the texture mapper at least comprises a texture data fetching circuit (circuitry) that is operable to (configured to) fetch from memory texture data values to be used when performing a texturing operation. The texture mapper in an embodiment also comprises a texture filtering circuit (circuitry) that is operable to (configured to) perform a texturing operation using texture data values fetched by the texture fetching circuit. The texture filtering circuit (stage) is in an embodiment also operable to (configured to) calculate (e.g. internally) a set of interpolation weight values to be used for a texture mapping operation (and to then perform the texture mapping operation using the set of calculated interpolation weight values and a set of fetched texture data values).

The texture data fetching circuit may comprise any desired and suitable processing circuit (circuitry) operable to perform the required functions. This circuit may be in the form of one or more dedicated hardware elements that are configured appropriately, or it may comprise programmable processing circuitry that has been programmed appropriately.

The texture data fetching circuit may further comprise local storage operable to store input texture data values locally to the texture mapper. For example, the local storage unit may comprise a local cache. The cache may be operable to store, and may store, any desired and suitable amount of texture data.

The texture data fetching circuit may be operable to, in response to a request to use texture data values for an operation, first determine whether or not those data values are already stored locally (have already been fetched from memory), e.g. are in the local cache. When those data values are not already stored locally (have not previously been fetched from memory and, e.g. are not cached), then the texture data fetching circuit may fetch those data values from memory. The fetched data values may then be stored by the texture data fetching circuit in the local cache (e.g. for future re-use by the texture filtering circuit) and/or in other local storage (e.g. for immediate use by the texture filtering circuit). However, when the data values are already stored locally (have already been fetched from memory and, e.g. are cached), then the texture data fetching circuit may fetch those data values from the local cache directly, without sending any request out to the main memory system.

The texture data fetching circuit may be operable to fetch, and may fetch, two or more sets of texture data values (e.g. from respective "mipmaps") in parallel, e.g. to perform trilinear interpolation.

In an embodiment, the texture data fetching circuit comprises a "parking" buffer, that comprises (maintains) a record of pending (outstanding) texture mapping operations to be performed (e.g. that may still be waiting for data to be fetched from memory). When a texture mapping operation that is in the parking buffer is determined as being ready to be performed, the texture filtering circuit may read and then use the fetched data for the operation.

The record of outstanding texture mapping operations to be performed that is maintained in the parking buffer can take any desired and suitable form. For example, the record may comprise a set of record indices for respective texture mapping operation entries, with a given texture mapping operation being assigned to a particular record index.

The parking buffer in an embodiment stores for each entry in the buffer (record) (for each outstanding texturing mapping operation to be performed in the record), appropriate control (state) data for that operation (a "payload record"), such as one or more indicators and other information for the texture mapping operation that is waiting to be performed, such as meta data needed in order to be able to perform the texture mapping operation. This information may, for example, indicate the particular data and/or parameters that are to be used for the texture mapping operation, the particular type of operation that is to be performed, etc.

The entry for a pending texture mapping operation in the record (in the parking buffer) in an embodiment also indicates the data required for the texture mapping operation that the record (entry) relates to, for example, and in an embodiment, in the form of appropriate addresses (e.g. memory or cache addresses, and in an embodiment cache addresses) where the data (the texels) that is required is stored.

In the case of a combined texturing operation in the manner of the technology described herein, where data will be fetched for two sets of plural threads for a given texture mapping operation, then where such a texture mapping operation needs to be included in the record of pending texture mapping operations (in the parking buffer), it would, e.g., be possible to use two entries in the record for that texturing mapping operation, one for each set of plural threads that the texture mapping operation relates to.

However, in an embodiment, the record of pending texture mapping operations (the parking buffer) is configured such that each entry in the record (in the parking buffer) can store all the data required for the plural sets of threads that the texture mapping operation relates to (rather than having to use a separate record (parking buffer) entry for each set of plural threads).

As, as discussed above, the "merged" sets of plural threads for the texture mapping operation should, and in an embodiment do, use the same control (state) information, in an embodiment, this is achieved by configuring the record of pending texture mapping operations (the parking buffer) such that each entry can store the relevant indicators (e.g. cache addresses) of the data (texels) required for the texture mapping operation for however many sets of plural threads may be combined (e.g. for the maximum number of sets of plural threads that can be combined (and so for two "quads" in embodiments of the technology described herein), but with, for example, the record still only storing a single set of control ("payload") information for the texture mapping operation.

The texture filtering circuit of the texture mapper can comprise any desired and suitable processing circuit operable to perform the required filtering functions. This processing circuit may be in the form of one or more dedicated hardware elements that are configured appropriately, or it may comprise programmable processing circuitry that has been programmed appropriately. In one embodiment, a dedicated texture filtering circuit (hardware) is used.

The texture filtering circuit may comprise circuitry operable to read texture data values stored locally to the texture mapper (e.g. in the local storage) and then use those data values to perform a texture mapping operation. The texture filtering circuit may further comprise circuitry operable to (e.g. internally) calculate interpolation weight values to be used in a texture mapping operation and use those calculated interpolation weight values to perform a texture mapping operation.

In embodiments, the texture filtering circuit is operable to perform, and can perform, a number of different filtering operations, such as bilinear, trilinear and anisotropic filtering (with a texturing request then indicating which filtering operation is to be performed for the texturing operation in question).

The texture mapper in an embodiment also comprises a coordinate computation circuit that is operable to determine the texel positions (the texel indices) in the texture to be fetched for the texturing operation from the sampling position coordinates for which to perform the texture mapping operation indicated in the texturing request.

This coordinate computation circuit in an embodiment comprises plural sets of plural coordinate computation pipelines, one set for each thread of a set of plural execution threads that will be processed together, with each coordinate computation pipeline of a set of coordinate computation pipelines being operable to process one sampling position coordinate when determining the texels (the texel indices) to be fetched for a texturing operation for the sampling position (thread) in question.

In an embodiment, the coordinate computation circuit comprises four coordinate computation pipelines that operate in parallel for each execution thread, as that will then allow respective pairs of the coordinate computation pipelines to handle 2D (two dimensional) coordinates for two sampling positions (threads) in parallel (simultaneously).

The texture mapper may also comprise an appropriate texturing instruction receiving circuit that may, for example, also be operable to trigger the fetching of texturing control data (input parameters), such as the texture descriptors discussed above, from the memory, and also to perform the determination in the manner of the technology described herein whether texturing requests for plural sets of plural threads can be combined into a single texturing operation.

Where the texture mapper determines that the texturing operation for plural sets of plural threads can be performed together, then it will perform the texturing operation for the sets of plural threads together (in parallel), i.e. as a single sequence of processing, but provide plural (e.g. two) sets of texturing operation output results from that sequence of processing, one for each set of plural threads for which the texturing operation has been performed together. The texturing output results will then be returned to the renderer (fragment shader) for use. Each set of texturing output results should, and in an embodiment does, comprise a respective result value for each thread in the set of plural threads (which may be the same as or different to, the result value for the other threads in the set of plural threads).

In the case where it is determined that the texturing operation for a set of plural threads cannot be performed together with the texturing operation for another set of plural execution threads, then the texture mapper will simply perform the texturing operation for that set of plural threads alone (and thus return a single set of results for that set of plural threads alone).

Although the technology described herein has been described above primarily with reference to the consideration of a texturing operation for a set of plural threads (and whether that texturing operation for that set of plural threads can be combined with the texturing operation for another set of plural threads), in practice when generating a render output, a given texturing operation will be repeated for plural sets of plural threads, e.g. across the entire area of the render output being generated. Thus the technology described herein is in an embodiment performed in respect of plural sets of plural threads that are executing a fragment shader program, such as, and in an embodiment, for each set of plural threads that is to execute a fragment shader program that includes an appropriate texturing operation when generating a render output.

The technology described herein can be used for any form of texture data that is being processed by a fragment shader program. Thus it can be used where the textures represent appropriate colour values (RGBα values) (and in one embodiment this is the case), such as images, but also in the case where the texture data represents other graphics processing parameters and data that may be used when generating a render output, such depth values, etc.

The technology described herein also extends to the texture mapper per se.

Thus, a further embodiment of the technology described herein comprises a method of operating a texture mapping apparatus operable to perform graphics texturing operations in response to requests for graphics texturing operations from a fragment shader;
wherein:
the texture mapping apparatus is operable to, in response to a request from a fragment shader to perform a texturing operation for a set of plural execution threads that are executing a graphics texturing instruction in a shader program:
perform the texturing operation for the set of plural execution threads together;
the method comprising:
when the texture mapping apparatus is to perform a texturing operation for a set of plural execution threads together, the texture mapping apparatus:
determining whether the texturing operation for the set of plural threads can be performed together with the texturing operation for another set of plural execution threads for which a texturing operation is required; and
when it is determined that the texturing operations for the sets of plural execution threads can be performed together, performing the texturing operations for the sets of plural threads together; and
when it is determined that the texturing operation for the set of plural threads cannot be performed together with the texturing operation for another set of plural execution threads for which a texturing operation is required, performing the texturing operation for the set of plural execution threads alone.

A further embodiment of the technology described herein comprises a texture mapping apparatus operable to perform graphics texturing operations in response to requests for graphics texturing operations from a fragment shader;
wherein:
the texture mapping apparatus is operable to, in response to a request from a fragment shader to perform a texturing operation for a set of plural execution threads that are executing a graphics texturing instruction in a shader program:
perform the texturing operation for the set of plural execution threads together;
and the texture mapping apparatus is further configured to:
when the texture mapper is to perform a texturing operation for a set of plural execution threads together:
determine whether the texturing operation for the set of plural threads can be performed together with the texturing operation for another set of plural execution threads for which a texturing operation is required; and
when it is determined that the texturing operations for the sets of plural execution threads can be performed together, perform the texturing operations for the sets of plural threads together; and
when it is determined that the texturing operation for the set of plural threads cannot be performed together with the texturing operation for another set of plural execution threads for which a texturing operation is required, perform the texturing operation for the set of plural execution threads alone.

As will be appreciated by those skilled in the art, these embodiments of the technology described herein can, and in an embodiment do, include any one or more or all of the features of the technology described herein described herein, as appropriate.

The texture mapper and texture mapping apparatus may be part of a graphics processor (as discussed above), but it could also be a co-processor of a CPU, for example (i.e. coupled with a CPU that executes the fragment shader program), if desired.

The graphics processor and texture mapping apparatus of the technology described herein may be, and typically will be, part of an overall graphics and/or data processing system. Thus, the technology described herein also extends to a data or graphics processing system having a graphics processor and/or texture mapping apparatus as described herein.

The data or graphics processing system may comprise the memory or memories referred to herein, which may be external to the graphics processor and texture mapping apparatus. As discussed above, the memory or memories may be operable to store, and may store, a set of texture maps to be used in the texturing operation.

The graphics processor may include any one or more or all of the processing stages that a graphics processor (processing pipeline) can normally include. Thus, for example, the graphics processor may include a primitive setup stage, a rasteriser and/or a renderer. In an embodiment, the renderer may be in the form of or include a programmable fragment shader.

The graphics processor (processing pipeline) may comprise one or more programmable shading stages, such as one or more or all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The technology described herein can be used in and with any suitable and desired graphics processing system and processor. The technology described herein is particularly suitable for use with tiled renderers (tile-based graphics processing systems). Thus, in one embodiment, the graphics processor (processing pipeline) is a tiled-based graphics processor (processing pipeline).

Thus, as will be appreciated, embodiments may be implemented in a data processing system comprising a memory and a graphics processing unit (GPU) (a graphics processor) comprising a texture mapping apparatus as described herein. In an embodiment, the data processing system may further include a host processor that executes applications that can require data or graphics processing by the graphics processor and that instruct the graphics processor accordingly (e.g. via a driver for the graphics processor). The system may further include appropriate storage (e.g. memory), caches, etc.

The graphics processing system and/or graphics processor and/or texture mapping apparatus may also comprise, and/or be in communication with, one or more memories and/or memory devices that store the data described herein, and/or that store software for performing the processes described herein. The graphics processing system and/or graphics processor and/or texture mapping apparatus may also be in communication with a host microprocessor, and/or with a display for displaying images based on the data generated.

The technology described herein can be used for any form of output that a graphics texture mapper and graphics processor may be used to generate. In one embodiment it is used when a graphics processor is being used to generate images for display, but it can be used for any other form of graphics processing output, such as (e.g. post-processed) graphics textures in a render-to-texture operation, etc., that a graphics processor may produce, as desired. It can also be used when a texture mapper, graphics processor, etc., is being used to generate other (e.g. non-image or non-graphics) outputs.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As discussed above, the technology described herein relates to texture mapping in graphics processors.

Figure 6:
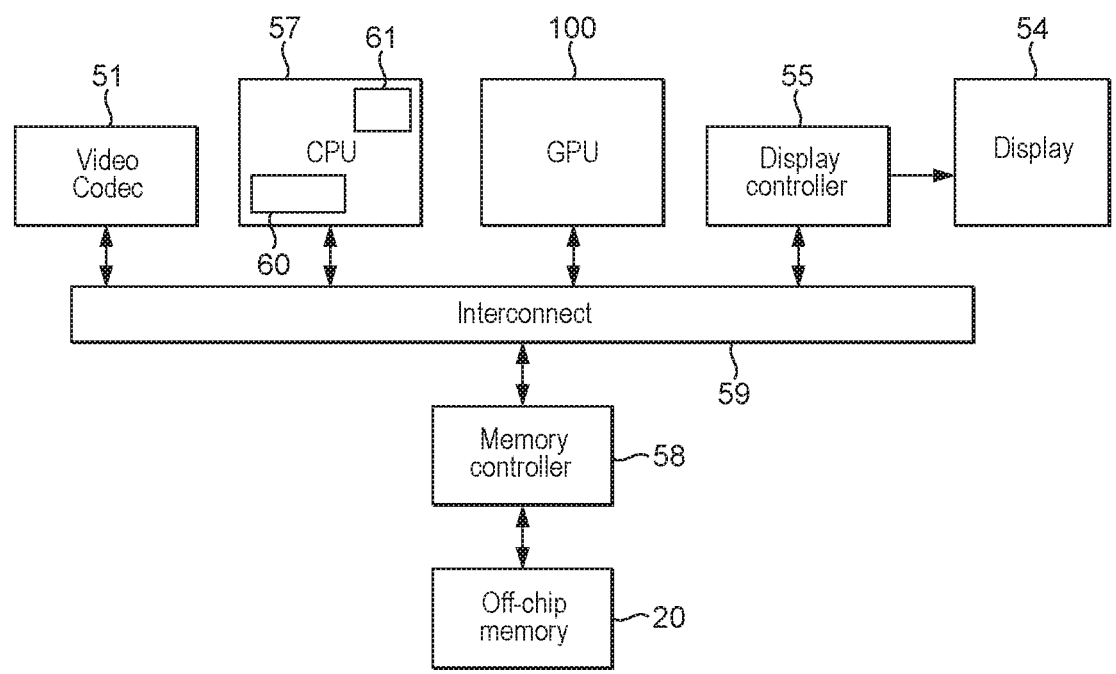
FIG. 6 shows an exemplary data processing system in which the technology described herein may be implemented.

FIG. 6 shows an exemplary data processing system in which the technology described herein and the present embodiments may be implemented.

The exemplary data processing system shown in FIG. 6 comprises a host processor comprising a central processing unit (CPU) 57, a graphics processor (GPU) 100, a video codec 51, a display controller 55, and a memory controller 58. As shown in FIG. 6, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 2:
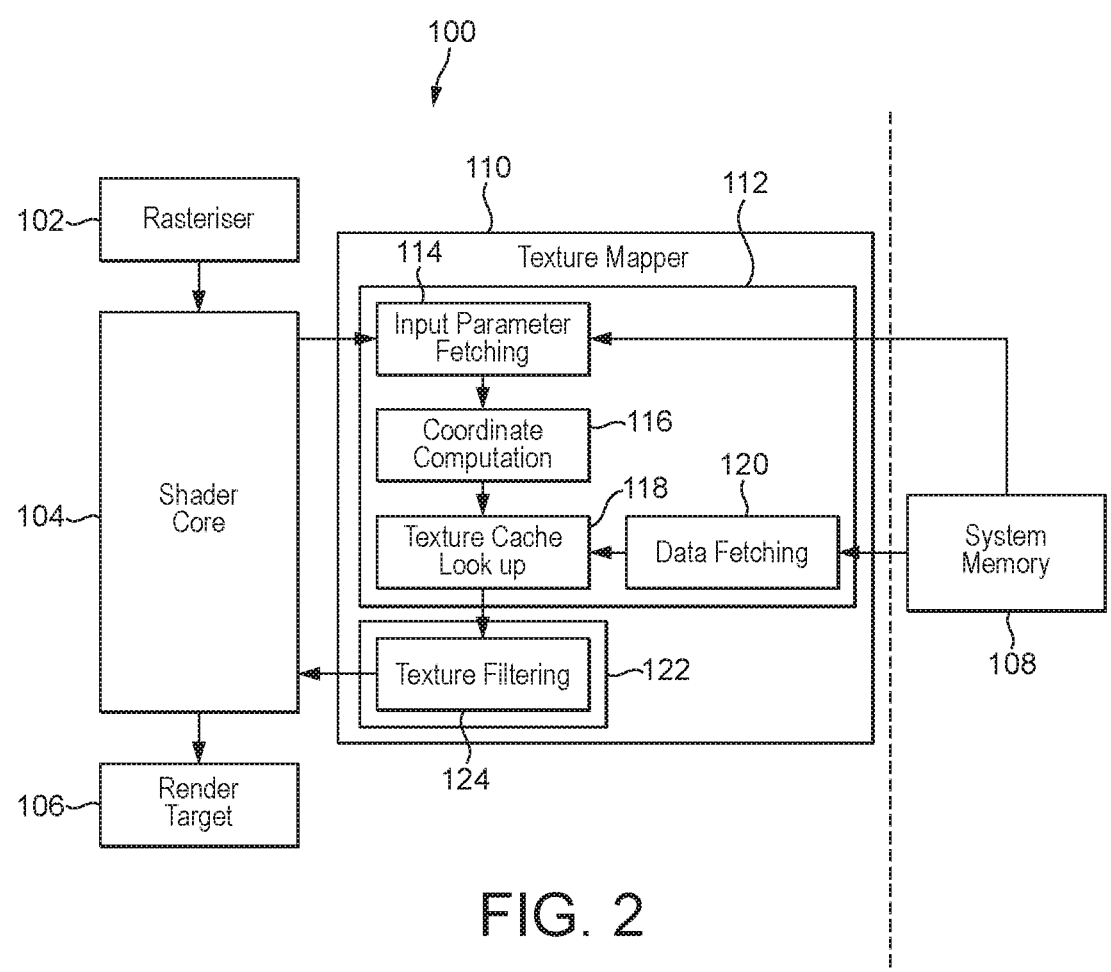
FIG. 2 shows schematically a graphics processor having a texture mapper in an embodiment of the technology described herein.

FIG. 2 shows schematically elements of a graphics processor (graphics processing unit (GPU)) 100 that are relevant to the operation of the present embodiments. As will be appreciated by those skilled in the art, there may be other elements of the GPU 100 that are not illustrated in FIG. 2.

In the present embodiment, the GPU 100 is a tile-based graphics processor. However, other arrangements are possible.

As shown in FIG. 2, the GPU 100 comprises data processing circuitry that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed). The GPU 100 is in communication with the external memory 108, but the external memory 108 does not form part of the GPU 100 and instead forms part of an overall host data processing system that comprises, inter alia, the GPU 100 and memory 108.

The memory 108 will store, inter alia, graphics textures to be used by the GPU 100 when performing texture mapping operations. The memory 108 may, e.g., be a disk drive or other storage medium (e.g. a hard disk, a raid array of hard disks or a solid state disk) of or accessible to the host system in which the GPU 100 is located, and may be an internal storage medium of the host system, or an external or removable storage medium.

The GPU 100 further comprises a texture mapper (a texture mapping apparatus) 110. As shown in FIG. 2, the texture mapping apparatus 110 comprises a texture fetching circuit 112, which in this embodiment includes an input parameter fetching unit 114, a coordinate computation unit 116, a texture cache lookup unit 118, and a data fetching unit 120. The texture mapping apparatus 110 further comprises a texture filtering unit 122, which includes a filtering circuit 124.

The arrows in FIG. 2 indicate the main ways in which data flows between the various components of the GPU 100 and the memory 108. There may also be other communication routes or directions that are not indicated.

The rasterizer 102 can receive, as its input, primitives (e.g. triangles) to be used to generate a render output, such as a frame to be displayed, and rasterizes those primitives into individual graphics fragments for processing. To do this, the rasterizer 102 rasterizes the primitives to sample points representing the render output, and generates graphics fragments representing appropriate sampling positions for rendering the primitives. The fragments generated by the rasterizer 102 are then sent onwards to the shader core (renderer) 104 for shading.

In this embodiment, the shader core 104 can execute shader programs for the fragments issued by the rasterizer 102 in order to render (shade) the fragments. The shader programs may have texturing instructions for texture mapping operations that are required to be executed by the texture mapping apparatus 110.

When a texturing instruction is encountered by the shader core 104, a texturing instruction is sent from the shader core 104 to the texture mapping apparatus 110, requesting the texture mapping apparatus 110 to perform a texturing operation. After the texture mapping apparatus 110 has finished its texture processing (carrying out the texturing instruction), the final result is sent back to the shader core 104 in a response message for use when shading the fragment in question.

The texture mapping apparatus 110 includes suitable processing circuitry to follow texturing instructions. This processing circuitry may be in the form of one or more dedicated hardware elements that are configured appropriately, or it may comprise programmable processing circuitry that has been programmed appropriately. In this embodiment, a dedicated hardware texture mapping apparatus 110 is used.

When instructed by the shader core 104 to perform a texture mapping operation, the texture mapping apparatus 110 reads textures from the memory 108 (as required), performs the texture mapping operation, and returns a (e.g. RGB) colour sampled from the texture back to the shader core 104.

As part of this processing, the input parameter fetching unit 114 receives the texturing instruction message from the shader core 104 indicating the texture or textures to be used (e.g. a texture field may be provided that includes a texture descriptor (TXD)), the particular type (e.g. bilinear, trilinear, etc.) of texture mapping operation to perform (e.g. a sampler field may be provided that includes a sampler descriptor (SMD)), and the sampling position coordinates at which to perform the texture mapping operation (e.g. given in a normalized coordinate-system where (0.0, 0.0) is the top-left corner of the texture and (1.0, 1.0) is the bottom-right corner of the texture).

The texture descriptor (TXD) which is used when requesting a texture mapping operation to be performed may, e.g., indicate one or more surface or plane descriptors (SFD) for one or more input arrays or surfaces (textures, images or other arrays) to be used in a texture mapping operation. Each SFD may indicate the parameters for a data array to be used in a texture mapping operation.

The sampler descriptor (SMD) which is used when requesting a texture mapping operation may indicate the filtering method (e.g. bilinear, trilinear, etc.) and other parameters to be used for the texture mapping operation.

The coordinate computation unit 116 then determines, from the sampling position coordinates, the texels (the texel indices) in the texture to be looked up from the data fetching unit 120.

The texture cache lookup unit 118 then checks whether the required texture data (the required texels) is already stored in a cache of the data fetching unit 120 and, if not present, fetches the texture data (the texels) into the texture mapping apparatus 110. For a typical bilinear lookup, texture data from four texels are read from a 2×2 texel region of the texture in memory 108. For a typical trilinear lookup, texture data from two sets of four texels are read from two 2×2 texel regions of respective texture "mipmaps" in memory 108.

The texture filtering unit 122 then reads in the four texels of each bilinear lookup, determines interpolation weight values and computes an interpolated result from the texture data values for the sampling position in question. In the case of trilinear interpolations, the results of two bilinear lookups are combined into a result for the sampling position in question. The result is then output to (returned to) the shader core 104.

The "shaded" fragment from the shader core 104 is then stored as part of the output render target in the buffer 106, e.g. in the memory 108, e.g. for subsequent post-processing or display.

Other arrangements for the graphics processor and system would, of course, be possible.

FIG. 2 accordingly shows an overview of a GPU 100 comprising a texture mapping apparatus 110 according to an embodiment of the technology described herein. However, it should be noted that FIG. 2 is only schematic and that various components and connections have been omitted from that Figure for the sake of clarity.

Figure 3:
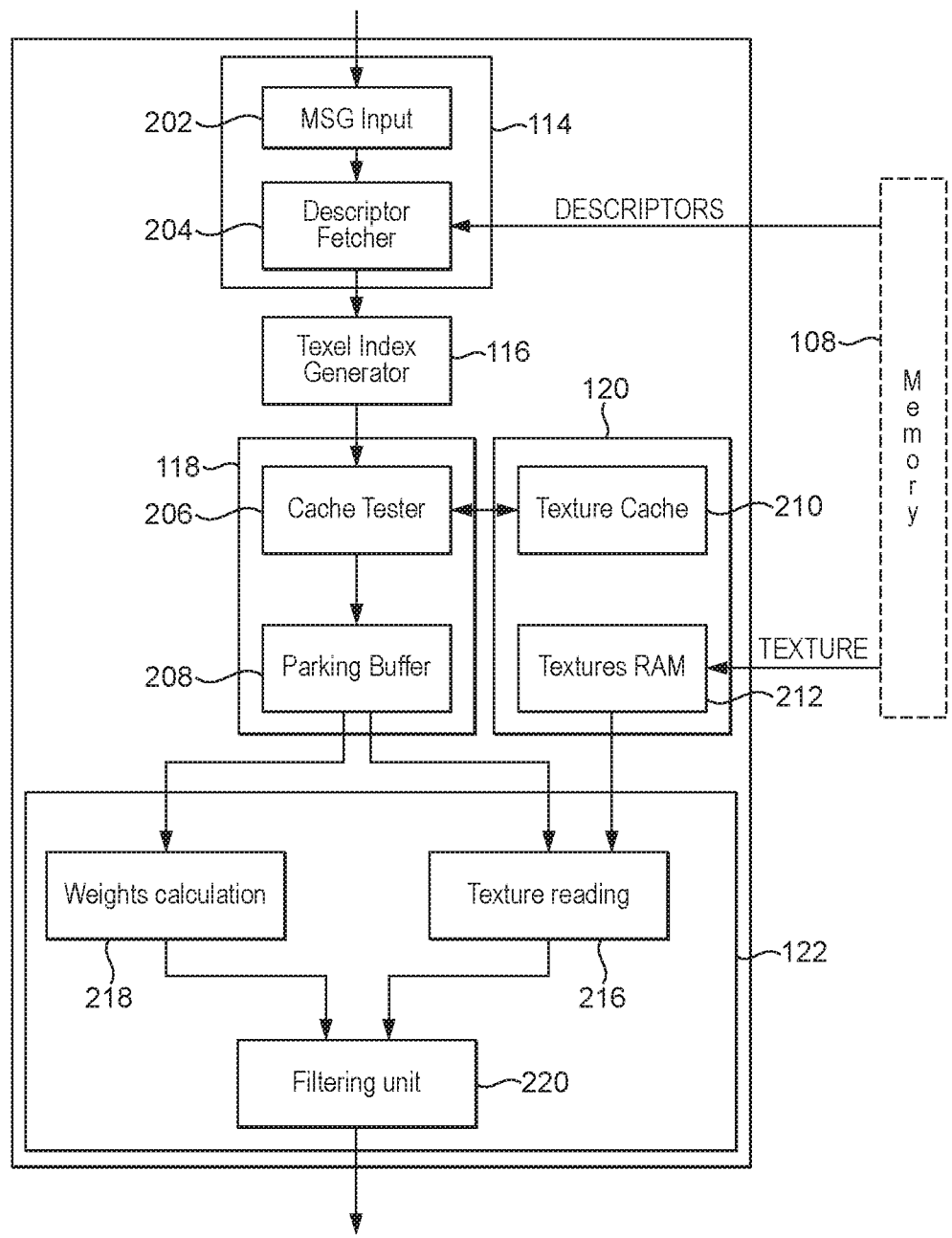
FIG. 3 shows schematically and in more detail a texture mapping apparatus according to an embodiment of the technology described herein.

FIG. 3 shows the texture mapper (texture mapping apparatus) 110 in further detail.

As is shown in FIG. 3, the input parameter fetching unit 114 of the texture mapping apparatus 110 comprises an instruction message input unit 202 that receives a texturing instruction from the shader core 104. The input parameter fetching unit 114 further comprises a descriptor fetching unit 204 that retrieves input parameters (control data) for the texture mapping operation from memory 108.

The input parameters are then passed to the coordinate computation unit 116 where the actual indices for the data values (texels) to be fetched are generated.

As is also shown in FIG. 3, the texture cache lookup unit 118 comprises a cache tester 206 which determines whether the required data (texels) is already cached locally. If the required data is not cached locally, a request is made to fetch the required data from memory 108. The texture mapping operation is then parked in a parking buffer 208 of the texture cache look up unit 118 to await processing (e.g. pending the required data being fetched from memory 108).

As is shown in FIG. 3, the data fetching unit 120 comprises a texture cache 210. The texture cache 210 comprises individually addressable cache lines that can store texture data (texel) values locally to the texture mapping apparatus 110. The data fetching unit 120 further comprises a textures RAM 212 comprising individually addressable RAM banks that can store texture data values locally to the texture mapping apparatus 110.

As is shown in FIG. 3, the texture filtering unit 122 comprises a texture reading unit 216 that receives a processing pass for a texture mapping operation from the parking buffer 208 and reads the required data for that pass from the textures RAM 212. The texture filtering unit 122 further comprises a weights calculation unit 218 that also receives the processing pass for the texture mapping operation from the parking buffer 208 and calculates interpolation weight values for the texture mapping operation. The texture filtering unit 122 further comprises a filtering unit 220 that multiplies the respective data values by their respective weight values and combines the results of the multiplications to provide an output value for the processing pass in question.

In this embodiment, the filtering unit 220 can perform either two bilinear filtering passes in parallel (e.g. for two bilinear processing operations or for a single trilinear processing operation). In either case, 8 weight values are applied to 8 input data values per cycle of operation.

FIG. 3 accordingly shows an overview of a texture mapping apparatus 110 according to an embodiment of the technology described herein. However, it should again be noted that FIG. 3 is only schematic and that various components and connections have been omitted from that Figure for the sake of clarity.

In the present embodiments, the shader core 104 is configured to send texturing requests to the texture mapper 110 for groups of four execution threads that correspond to a "quad" of 2×2 sampling positions in the render output being generated. Thus, in the present embodiments, each texturing request operation requests a texturing operation for a "quad" of 2×2 sampling positions.

The texture mapper 110 then performs the requested texturing operation for the "quad". Thus, where the texturing operation to be performed comprises bilinear filtering, the texturing operation for the quad will be formed of a group of four bilinear filtering passes, with each bilinear filtering pass generating data for one of the sampling positions of the quad, and each bilinear filtering pass for a sampling position of the quad using texture data for a 2×2 block of four texels.

Figure 4:
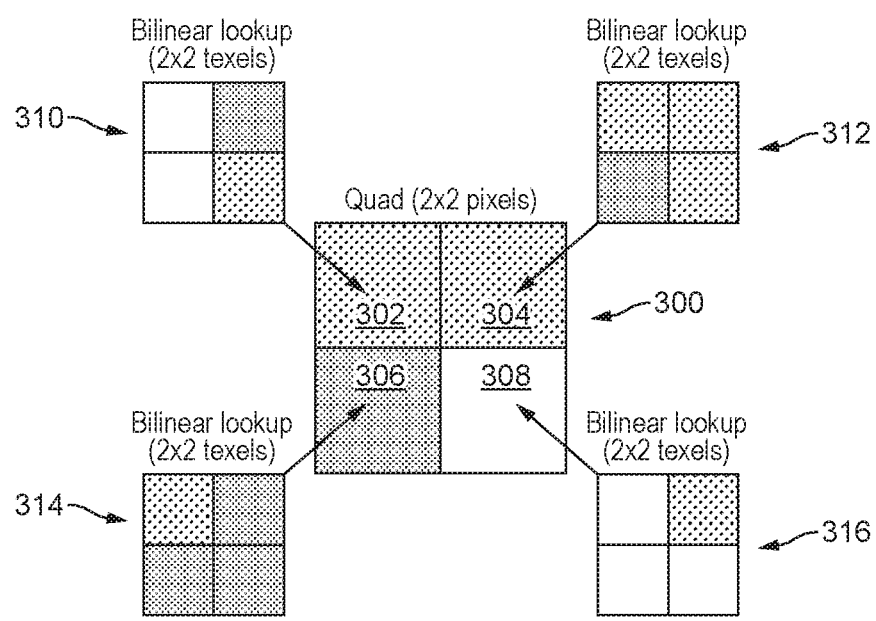
FIG. 4 shows schematically a texturing operation for a "quad" of sampling positions.

FIG. 4 illustrates this and shows the relationship between the sampling positions of a "quad" and the texels of the texture. As is shown in FIG. 4, a quad 300 relates to four sampling positions 302, 304, 306, 308. A first sampling position 302 of the quad will use a first 2×2 block of four texels 310, a second sampling position 304 of the quad will use a second 2×2 block of four texels 312, a third sampling position 306 of the quad will use a third 2×2 block of four texels 314, and a fourth sampling position 308 of the quad will use a fourth 2×2 block of four texels 316. (As discussed above with reference to FIG. 2, the (memory) addresses for the texels to be used in the bilinear filtering passes are calculated by the coordinate computation unit 116.)

Figure 7:
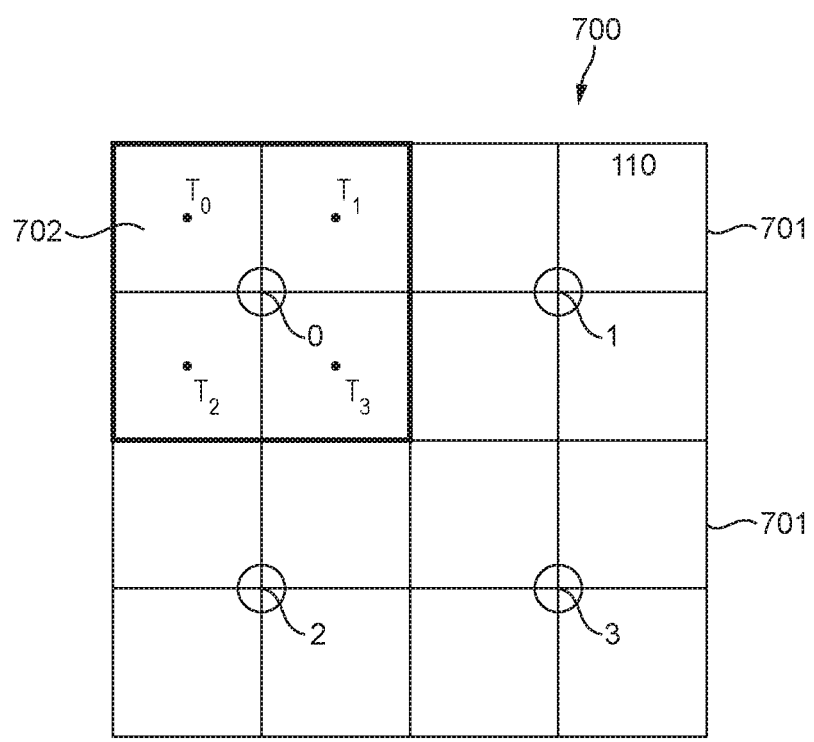
FIG. 7 shows the relationship between thread groups (warps), quads and threads in an embodiment of the technology described herein.

In the present embodiments, the fragment shader 104 is operable to process threads as respective groups of threads in lockstep. In the present embodiments, the fragment shader 104 processes thread groups (warps) corresponding to four quads of four threads each (and thus comprising sixteen threads in total). FIG. 7 illustrates this, and shows a thread group (warp) 700 comprising four quads 701 (in a 2×2 pattern), with each quad 701 comprising four threads 702 (corresponding to a 2×2 quad of sampling positions).

In the present embodiments, and in accordance with the technology described herein, the texture mapper 110 is operable to determine whether respective separate sets of plural execution threads ("quads") for which it is performing texturing operations can in fact be processed together (be "merged") into a single texturing operation that performs the texturing operation for the plural sets of plural threads together. In the present embodiments, the texture mapper can "merge" two quads when performing a texturing operation, and determines whether a quad can be merged with the next quad to be processed or not. Other arrangements would, of course, be possible.

Figure 5:
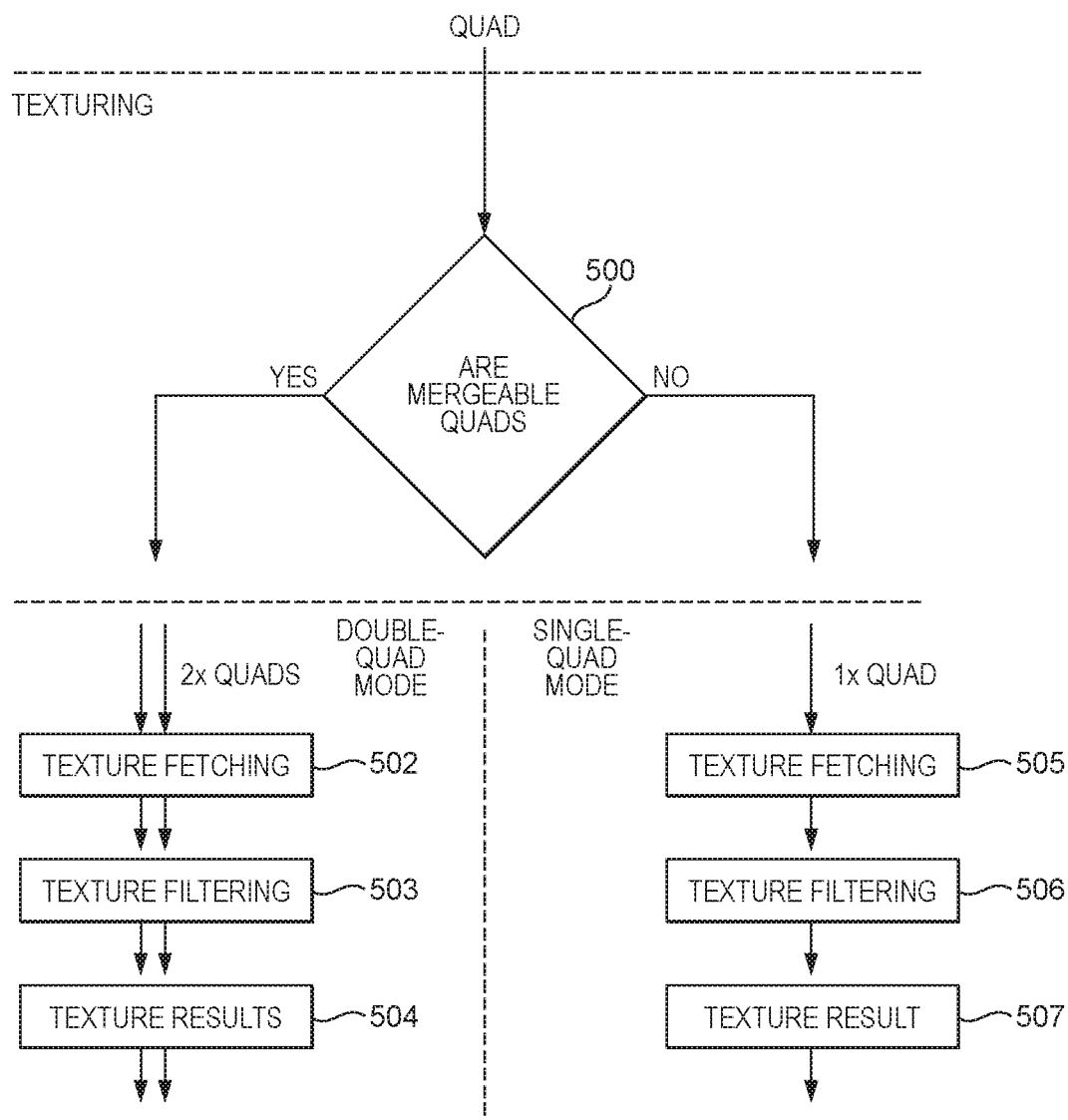
FIG. 5 shows a method of operating a texture mapping apparatus according to an embodiment of the technology described herein.

FIG. 5 illustrates this, and shows that when the texture mapper receives a quad for processing, it first determines whether that quad can be merged with the next quad for the texture mapping operation (i.e. whether the texturing operation for the quad can be performed together with the texturing operation for another (the next) quad) (step 500). This is done by the message input unit 202 shown in FIG. 3.

The texture mapper 110 determines whether the texturing operation for a quad can be performed together with the texturing operation for another quad based on whether the texturing operations and the parameters (settings) for the texturing operations for the quads are sufficiently similar. In the present embodiments, two quads are merged for a texturing operation when the two quads are performing the same (or very similar) texturing operation, reading the same texture(s), and using the same input (control) parameters (settings) for their texturing operations (i.e. such that the texturing operations for the quads differ only in terms of the texture coordinates that are being sampled by the quads). In particular, two quads can be merged when they are each performing a bilinear filtering operation, but not when they are each performing a trilinear filtering operation.

Thus, the texture mapper 110 will compare the input parameters (control data) (the "descriptors") for the texturing operations for the quads being considered, to see if they are sufficiently similar (and in an embodiment the same), to thereby determine whether the texturing operations for the quads can be performed together or not. This check could be done by comparing the content of the, e.g. descriptors, but in an embodiment, is done by comparing respective identifiers, e.g. indices, that indicate the control data (e.g. descriptors) in question. Thus, if the two quads being considered have the same descriptor indices, it will be determined that the texturing operations for the quads can be combined (but not otherwise).

In an embodiment, the texturing operations for quads are combined where the quads belong to the same thread group (warp) (as discussed above) (as that should then ensure that the texturing operations share and use the same relevant control data (settings), etc.).

In the present embodiments, the texturing requests sent to the texture mapper identify quads for which a texturing request is sent that can (potentially) be combined with another quad when performing the texturing operation, using a flag that indicates to the texture mapper 110 that a quad could be "merged" with another quad for the texturing operation. (The use of such indications is not necessary, as the texture mapper can be configured to simply test quads in any event, without the need for any such indications.)

As shown in FIG. 5, where the texture mapper determines that the texturing operation for two quads can be performed together, then it performs the texturing operation for the two quads together (in parallel), i.e. as a single sequence of processing, but provides two sets of texturing operation output results from that sequence of processing, one for each quad for which the texturing operation has been performed together.

Thus, as shown in FIG. 5, when the texture mapper 110 determines at step 500 that the texturing operations for two quads can be merged, the texture mapper 110 performs the texturing operation (including fetching the texture data (step 502), performing the texture filtering (step 503), and returning a set of results for each quad (step 504)) for both quads, together (in parallel).

The texturing output results are then returned to the fragment shader for use. (Each set of texturing output results will comprise a respective result value for each thread in the quad (which may be the same as or different to, the result value for the other threads in the quad).)

On the other hand, as shown in FIG. 5, in the case where it is determined that the texturing operations for two quads cannot be performed together at step 500, then the texture mapper simply performs the texturing operation for each quad (including fetching the texture data (step 502), performing the texture filtering (step 503), and returning a set of results for the quad (step 504)) singly (on its own) (and thus returns a single set of texturing results for that quad alone).

The texture mapper 110 can be configured to determine whether the texturing operations for plural quads are mergeable or not, as desired.

For example, the texture mapper could be operable to take as an input two quads in the same cycle (i.e. have an input bus that is able to accept two quads in one cycle), with the texture mapper then determining whether those input quads can be "merged" or not.

In this case, when it is determined that the quads can be merged, then the texturing operations for those quads will be performed together starting in the next processing cycle, but when it is determined that the texturing operations for the quads should not be performed together, then the texture mapper is in an embodiment operable to perform (start) the texturing operation for one of the quads in the next cycle, whilst stalling the other quad for that cycle, and then perform (start) the texturing operation for the other quad in the next cycle.

Alternatively, the texture mapper could be operable to receive only a single quad as an input in any given cycle, such that it will take two cycles to receive a pair of quads. In this case, when the texture mapper receives a quad for a texturing operation (e.g. that is identified as potentially being able to be combined with another texturing operation), it could then stall that quad for one cycle to see if its texturing operation can be combined (performed together) with the texturing operation of the next quad, and then either initiate (perform) both texturing operations together in the next processing cycle, or perform the stalled texturing operation in the next cycle on its own (and so on for the sequence of quads for which the texturing operation is to be performed).

(In this case, in the case that the next texturing operation to be performed is not identified as potentially being combinable with another texturing operation, then that texturing operation would simply be sent to the texture pipeline for processing in the cycle in question (without stalling).)

Other arrangements would, of course be possible, and can be used, e.g. in dependence upon how many quads the texture mapper is able to receive as an input in a single cycle, with the processing being appropriately stalled for however many cycles are required to "collect" plural quads for processing together (where it is appropriate to do that).

In order to better facilitate the operation in the manner of the present embodiments, the parking buffer is in an embodiment configured such that each entry in the parking buffer can store all the data that could be required for performing a texturing operation for two quads of threads.

Similarly, the coordinate computation circuit is in an embodiment in the form of four coordinate computation pipelines (for each thread of a quad) (so 16 coordinate computation pipelines in total), that are each operable to process one sampling position coordinate when determining the texels (the texel indices) to be fetched for a texturing operation for a sampling position, as that will then allow respective pairs of the coordinate computation pipelines to handle 2D coordinates for two sampling positions (threads) in parallel (simultaneously).

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor, the graphics processor comprising:
a programmable fragment shader operable to execute graphics fragment shading programs to perform fragment shading operations; and
a texture mapper operable to perform graphics texturing operations in response to requests for graphics texturing operations from the fragment shader;
wherein:
the fragment shader processes graphics fragments by executing fragment shader programs using respective execution threads for sampling positions of a render output being generated by the graphics processor; and
the fragment shader is operable to, when it encounters a graphics texturing instruction in a fragment shader program that it is executing for a thread:
request the texture mapper to perform a graphics texturing operation for a set of plural threads that are executing the graphics texturing instruction in the fragment shader program; and
the texture mapper is operable to, in response to a request from the fragment shader to perform a texturing operation for a set of plural execution threads that are executing a graphics texturing instruction in a shader program:
perform the texturing operation for the set of plural execution threads together;
the method comprising:
when the texture mapper is to perform a texturing operation for a set of plural execution threads together, the texture mapper:
determining whether the texturing operation for the set of plural threads can be performed together with the texturing operation for another set of plural execution threads for which a texturing operation is required; and
when it is determined that the texturing operations for the sets of plural execution threads can be performed together, performing the texturing operations for the sets of plural threads together; and
when it is determined that the texturing operation for the set of plural threads cannot be performed together with the texturing operation for another set of plural execution threads for which a texturing operation is required, performing the texturing operation for the set of plural execution threads alone.

2. The method of claim 1, wherein each set of plural threads comprises four threads.

3. The method of claim 1, comprising performing the texturing operation for two sets of plural execution threads together.

4. The method of claim 1, wherein:
the texture mapper determines whether the texturing operation for a set of plural threads can be performed together with the texturing operation for another set of plural threads based on the types of texturing operation that the two sets of plural threads are performing.

5. The method of claim 1, wherein:
the texture mapper determines that the texturing operation for a set of plural threads can be performed together with the texturing operation for another set of plural threads when the two sets of plural threads are performing the same texturing operation, reading the same texture(s), and using the same control parameters for their texturing operations.

6. The method of claim 1, wherein:
the fragment shader processes execution threads as respective thread groups; and
the texture mapper determines that the texturing operation for a set of plural threads can be performed together with the texturing operation for another set of plural threads when the two sets of plural threads belong to the same thread group.

7. The method of claim 1, wherein the texturing requests sent to the texture mapper indicate for the set of plural execution threads for which the texturing request is sent, whether the set of plural execution threads can be combined with another set of plural execution threads when performing the texturing operation.

8. The method of claim 1, wherein the texture mapper is operable to:
take as an input plural sets of plural execution threads in the same cycle; and
determine whether the texturing operations of the input sets of plural execution threads can be performed together; and
the method comprises:
when the texture mapper determines that the texturing operations of the input sets of plural execution threads can be performed together, the texture mapper performing the texturing operations for the input sets of plural execution threads together starting in the next processing cycle; and
when the texture mapper determines that the texturing operations for the input sets of plural execution threads should not be performed together, the texture mapper performing the texturing operation for one of the sets of plural execution threads starting in the next processing cycle, whilst stalling the other set or sets of plural execution threads for that cycle, and then performing the texturing operation for another of the sets of plural execution threads starting in the next processing cycle.

9. The method of claim 1, wherein:
the texture mapper is operable to take as an input one set of plural execution threads in the same cycle; and
the method comprises the texture mapper when it receives an input set of plural execution threads for a texturing operation:
stalling that set of plural execution threads for one cycle to see whether its texturing operation can be combined with the texturing operation for the next input set of plural execution threads; and
when the texture mapper determines that the texturing operations of the input plural sets of plural execution threads can be performed together, performing the texturing operations for both input sets of plural execution threads together starting in the next processing cycle; and
when the texture mapper determines that the texturing operations for the sets of plural execution threads should not be performed together, performing the texturing operation for one of the input sets of plural execution threads starting in the next cycle on its own.

10. The method of claim 1, wherein the texture mapper maintains a record of pending texture mapping operations to be performed and the record of pending texture mapping operations is configured such that an entry in the record can store all the record data required for performing a texture mapping operation for plural sets of plural threads for which a texture mapping operation is to be performed together.

11. The method of claim 1, wherein the texture mapper comprises a coordinate computation circuit that is operable to determine the texel positions in a texture to be fetched for a texturing operation from sampling position coordinates for which the texture mapping operation is to be performed; and
the coordinate computation circuit is in the form of four coordinate computation pipelines, that are each operable to process one sampling position coordinate when determining the texels to be fetched for a texturing operation for a sampling position.

12. A graphics processor comprising:
a programmable fragment shader circuit operable to execute graphics fragment shading programs to perform fragment shading operations; and
a texture mapper circuit operable to perform graphics texturing operations in response to requests for graphics texturing operations from the fragment shader circuit;
wherein:
the fragment shader circuit processes graphics fragments by executing fragment shader programs using respective execution threads for sampling positions of a render output being generated by the graphics processor; and
the fragment shader circuit is operable to, when it encounters a graphics texturing instruction in a fragment shader program that it is executing for a thread:
request the texture mapper circuit to perform a graphics texturing operation for a set of plural threads that are executing the graphics texturing instruction in the fragment shader program;
the texture mapper circuit is operable to, in response to a request from the fragment shader circuit to perform a texturing operation for a set of plural execution threads that are executing a graphics texturing instruction in a shader program:
perform the texturing operation for the set of plural execution threads together;
and the texture mapper circuit is further configured to:
when the texture mapper circuit is to perform a texturing operation for a set of plural execution threads together:
determine whether the texturing operation for the set of plural threads can be performed together with the texturing operation for another set of plural execution threads for which a texturing operation is required; and
when it is determined that the texturing operations for the sets of plural execution threads can be performed together, perform the texturing operations for the sets of plural threads together; and
when it is determined that the texturing operation for the set of plural threads cannot be performed together with the texturing operation for another set of plural execution threads for which a texturing operation is required, perform the texturing operation for the set of plural execution threads alone.

13. The graphics processor of claim 12, wherein each set of plural threads comprises four threads.

14. The graphics processor of claim 12, wherein the texture mapper circuit is operable to perform a texturing operation for pairs of plural execution threads together.

15. The graphics processor of claim 12, wherein:
the texture mapper circuit is configured to determine whether the texturing operation for a set of plural threads can be performed together with the texturing operation for another set of plural threads based on the types of texturing operation that the two sets of plural threads are performing.

16. The graphics processor of claim 12, wherein:
the texture mapper circuit is configured to determine that the texturing operation for a set of plural threads can be performed together with the texturing operation for another set of plural threads when the two sets of plural threads are performing the same texturing operation, reading the same texture(s), and using the same control parameters for their texturing operations.

17. The graphics processor of claim 12, wherein:
the fragment shader circuit processes execution threads as respective thread groups; and the texture mapper circuit is configured to determine that the texturing operation for a set of plural threads can be performed together with the texturing operation for another set of plural threads when the two sets of plural threads belong to the same thread group.

18. The graphics processor of claim 12, wherein the texturing requests sent to the texture mapper circuit indicate for the set of plural execution threads for which the texturing request is sent, whether the set of plural execution threads can be combined with another set of plural execution threads when performing the texturing operation.

19. The graphics processor of claim 12, wherein the texture mapper circuit is configured to:
  take as an input plural sets of plural execution threads in the same cycle;
  determine whether the texturing operations of the input sets of plural execution threads can be performed together;
  and to:
    when it determines that the texturing operations of the input sets of plural execution threads can be performed together, perform the texturing operations for the input sets of plural execution threads together starting in the next processing cycle; and
    when it determines that the texturing operations for the input sets of plural execution threads should not be performed together, perform the texturing operation for one of the sets of plural execution threads starting in the next processing cycle, whilst stalling the other set or sets of plural execution threads for that cycle, and then perform the texturing operation for another of the sets of plural execution threads starting in the next processing cycle.

20. The graphics processor of claim 12, wherein the texture mapper circuit is configured to:
  take as an input one set of plural execution threads in the same cycle; and
  when it receives an input set of plural execution threads for a texturing operation:
    stall that input set of plural execution threads for one cycle to see whether its texturing operation can be combined with the texturing operation for the next input set of plural execution threads; and
    when it determines that the texturing operations of the input plural sets of plural execution threads can be performed together, perform the texturing operations for both input sets of plural execution threads together starting in the next processing cycle; and
    when it determines that the texturing operations for the sets of plural execution threads should not be performed together, perform the texturing operation for one of the input sets of plural execution threads starting in the next processing cycle on its own.

21. The graphics processor of claim 12, wherein the texture mapper circuit is configured to maintain a record of pending texture mapping operations to be performed and the record of pending texture mapping operations is configured such that an entry in the record can store all the record data required for performing a texture mapping operation for plural sets of plural threads for which a texture mapping operation is to be performed together.

22. The graphics processor of claim 12, wherein the texture mapper circuit comprises a coordinate computation circuit that is operable to determine the texel positions in a texture to be fetched for a texturing operation from sampling position coordinates for which the texture mapping operation is to be performed; and the coordinate computation circuit is in the form of four coordinate computation pipelines, that are each operable to process one sampling position coordinate when determining the texels to be fetched for a texturing operation for a sampling position.

23. A texture mapping apparatus operable to perform graphics texturing operations in response to requests for graphics texturing operations from a fragment shader;
the texture mapping apparatus comprising:
  a texturing operation circuit operable to, in response to a request from a fragment shader to perform a texturing operation for a set of plural execution threads that are executing a graphics texturing instruction in a shader program, perform the texturing operation for the set of plural execution threads together;
  and the texture mapping apparatus further comprising:
    a texturing operation merging circuit configured to, when the texture mapper is to perform a texturing operation for a set of plural execution threads together:
      determine whether the texturing operation for the set of plural threads can be performed together with the texturing operation for another set of plural execution threads for which a texturing operation is required; and
      when it is determined that the texturing operations for the sets of plural execution threads can be performed together, cause the texturing operation circuit to perform the texturing operations for the sets of plural threads together; and
      when it is determined that the texturing operation for the set of plural threads cannot be performed together with the texturing operation for another set of plural execution threads for which a texturing operation is required, cause the texturing operation circuit to perform the texturing operation for the set of plural execution threads alone.

24. A non-transitory computer readable storage medium storing computer software code which when executing on a processor performs a method of operating a graphics processor, the graphics processor comprising:
  a programmable fragment shader operable to execute graphics fragment shading programs to perform fragment shading operations; and
  a texture mapper operable to perform graphics texturing operations in response to requests for graphics texturing operations from the fragment shader;
  wherein:
  the fragment shader processes graphics fragments by executing fragment shader programs using respective execution threads for sampling positions of a render output being generated by the graphics processor; and
  the fragment shader is operable to, when it encounters a graphics texturing instruction in a fragment shader program that it is executing for a thread:
    request the texture mapper to perform a graphics texturing operation for a set of plural threads that are executing the graphics texturing instruction in the fragment shader program; and
  the texture mapper is operable to, in response to a request from the fragment shader to perform a texturing operation for a set of plural execution threads that are executing a graphics texturing instruction in a shader program:
    perform the texturing operation for the set of plural execution threads together;
  the method comprising:

when the texture mapper is to perform a texturing operation for a set of plural execution threads together, the texture mapper:

determining whether the texturing operation for the set of plural threads can be performed together with the texturing operation for another set of plural execution threads for which a texturing operation is required; and when it is determined that the texturing operations for the sets of plural execution threads can be performed together, performing the texturing operations for the sets of plural threads together; and when it is determined that the texturing operation for the set of plural threads cannot be performed together with the texturing operation for another set of plural execution threads for which a texturing operation is required, performing the texturing operation for the set of plural execution threads alone.

* * * * *